Figure 1:
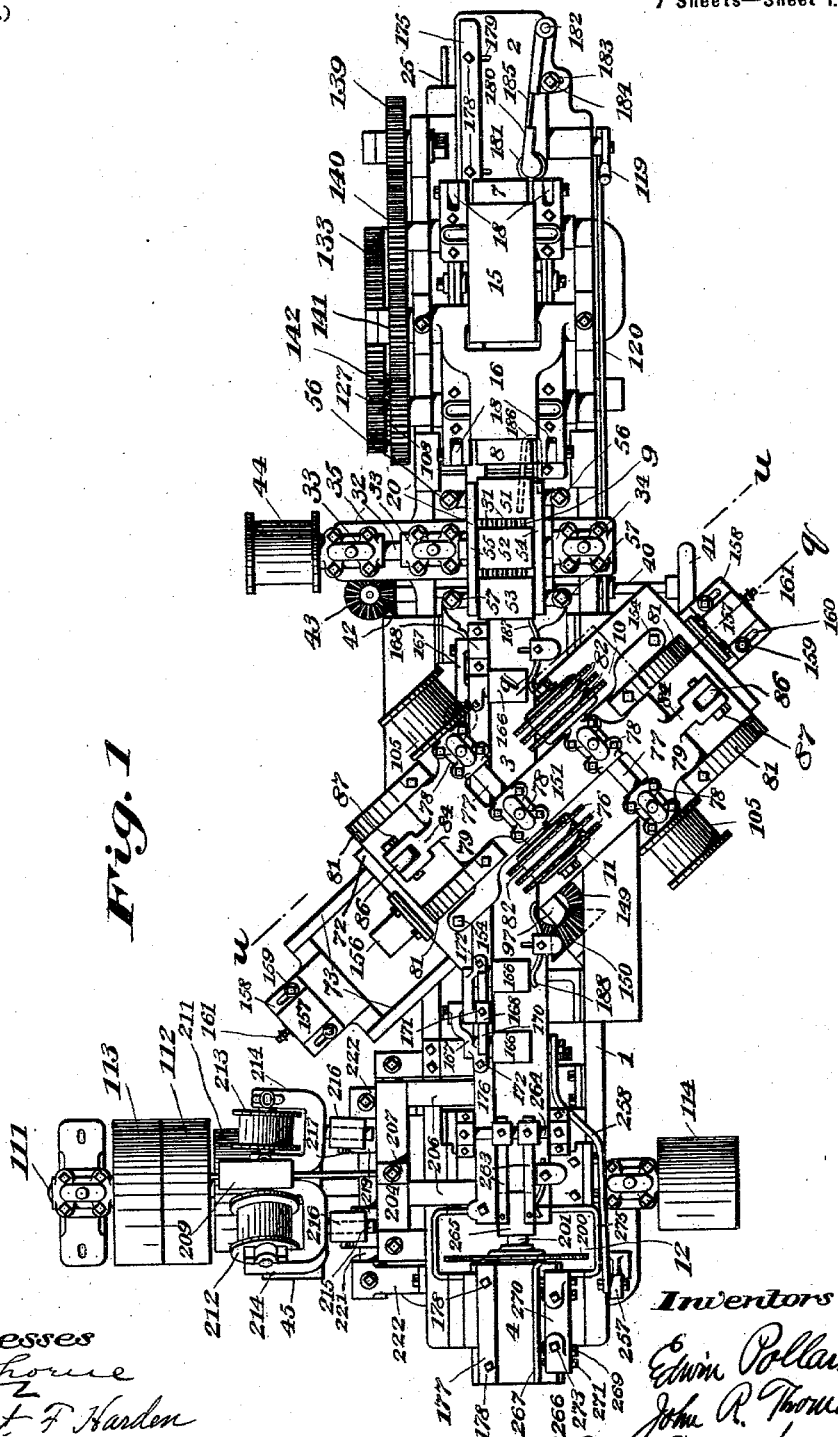

No. 708,073. Patented Sept. 2, 1902.
E. POLLARD & J. R. THOMAS.
FIRE LIGHTER MACHINE.
(Application filed July 27, 1901.)
(No Model.) 7 Sheets—Sheet 1.

Witnesses
Inventors
Edwin Pollard
John R. Thomas,

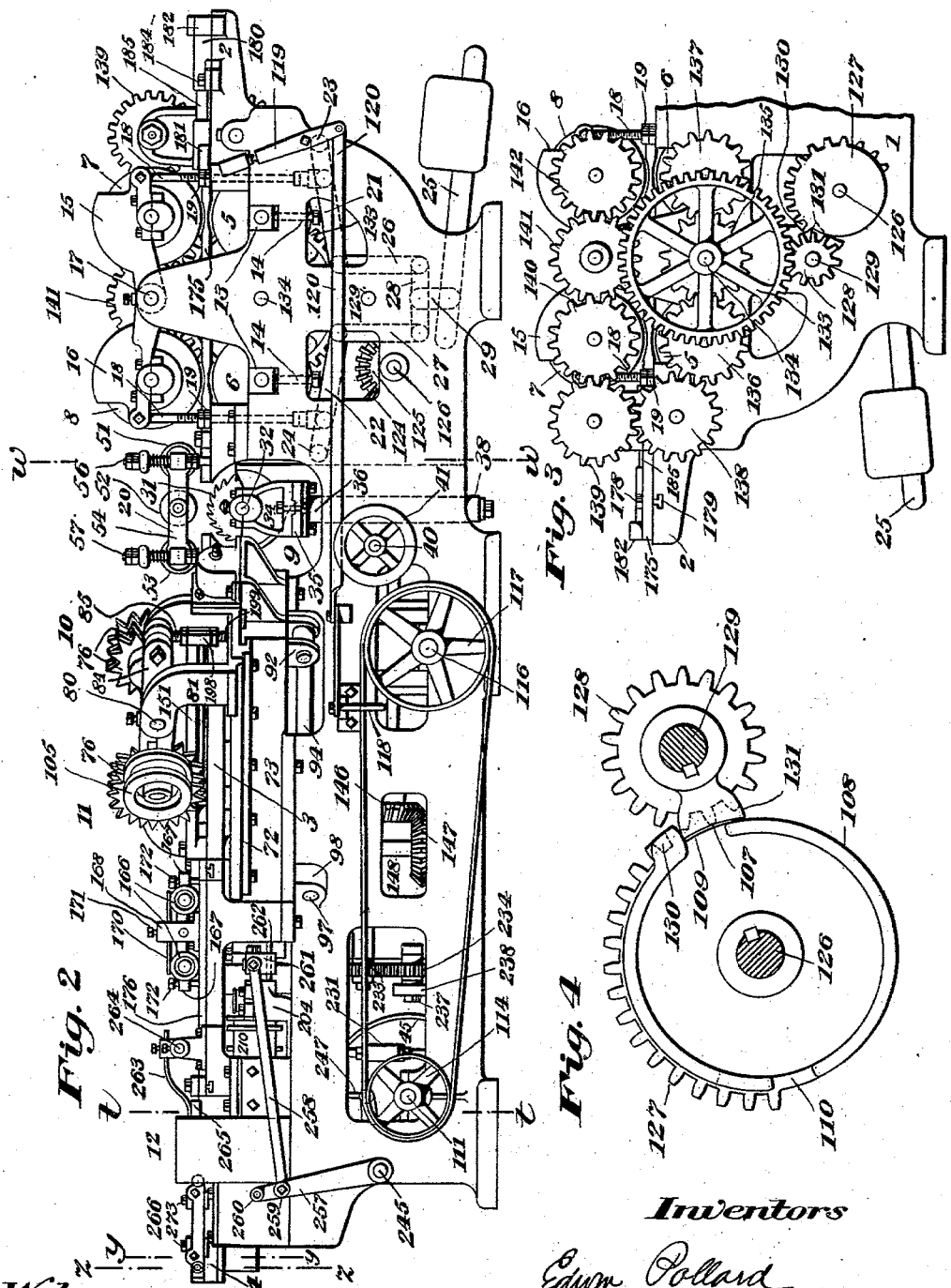

No. 708,073. Patented Sept. 2, 1902.
E. POLLARD & J. R. THOMAS.
FIRE LIGHTER MACHINE.
(Application filed July 27, 1901.)
(No Model.) 7 Sheets—Sheet 3.
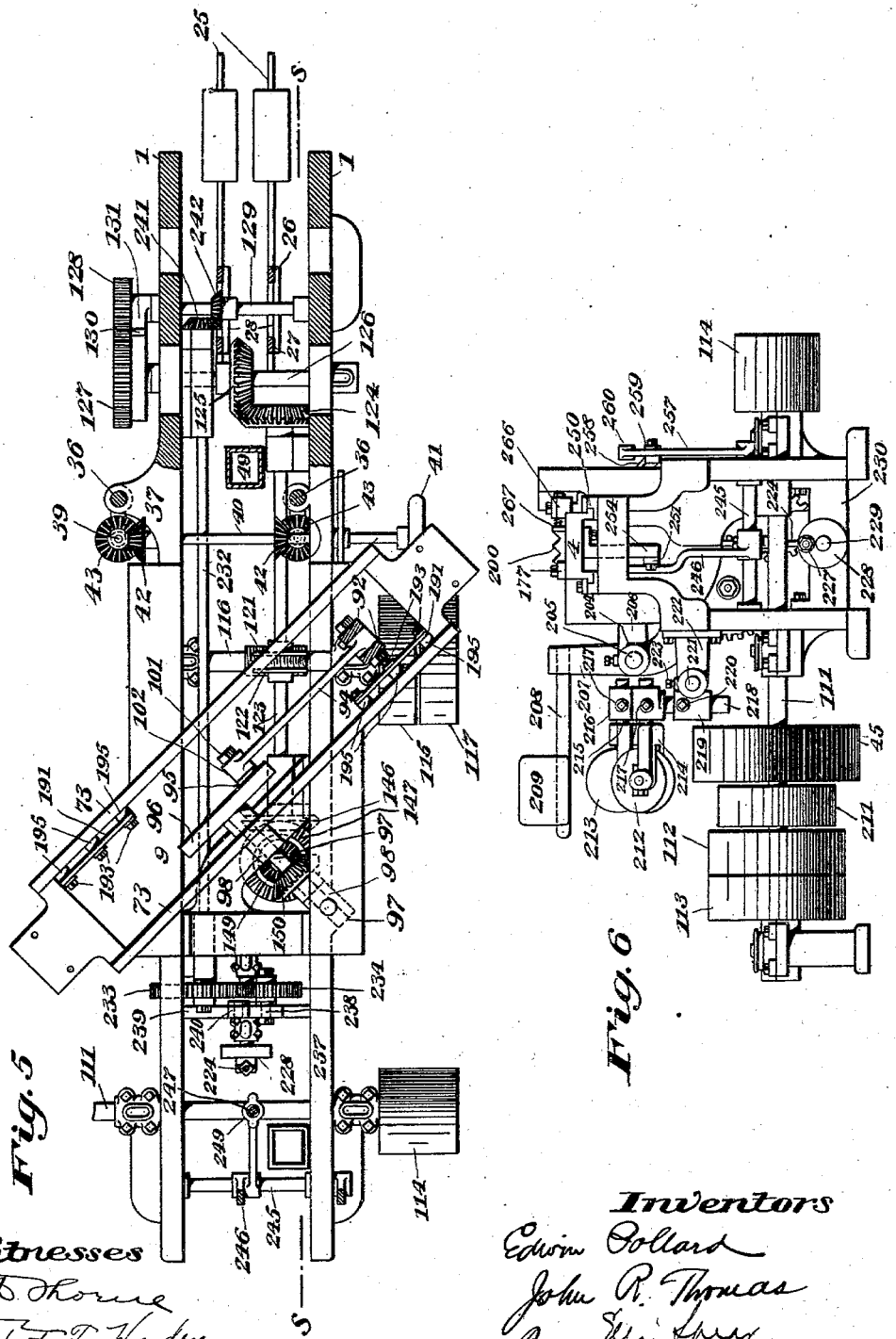

No. 708,073. Patented Sept. 2, 1902.
E. POLLARD & J. R. THOMAS.
FIRE LIGHTER MACHINE.
(Application filed July 27, 1901.)
(No Model.) 7 Sheets—Sheet 4.
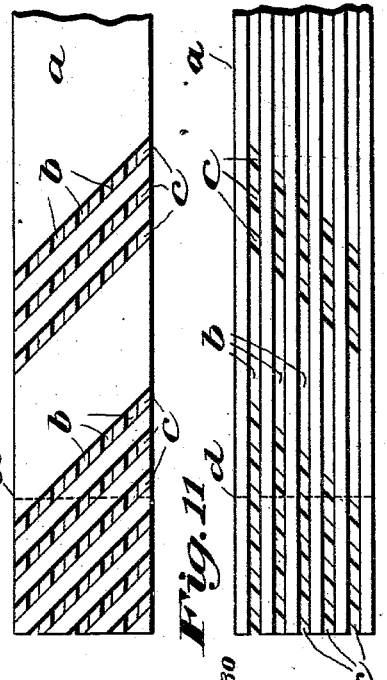
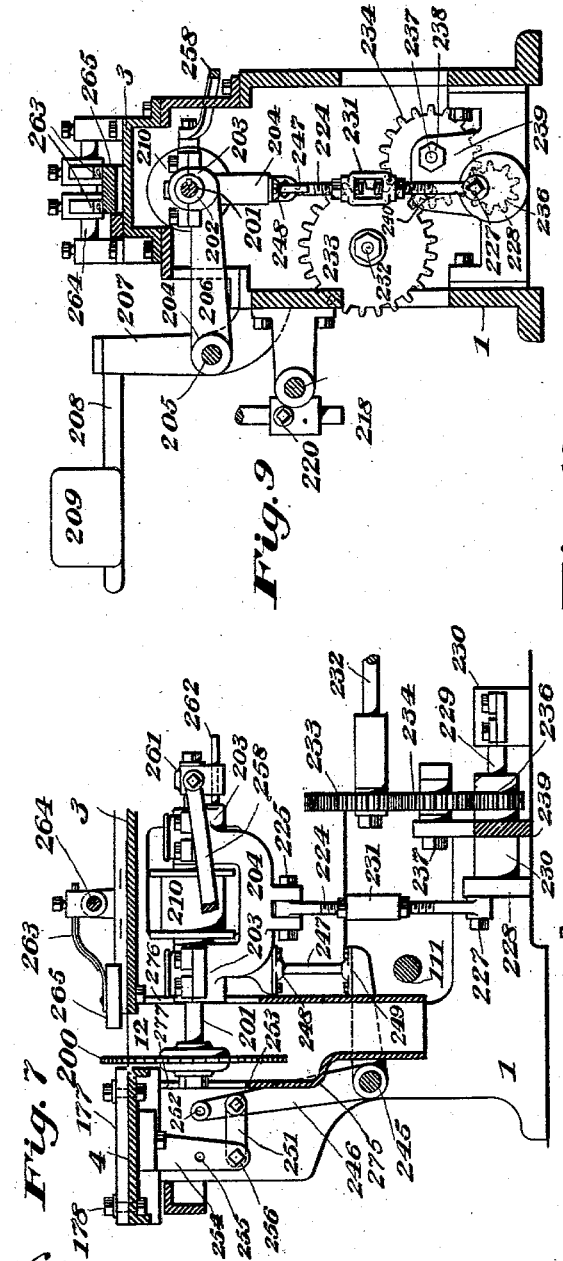
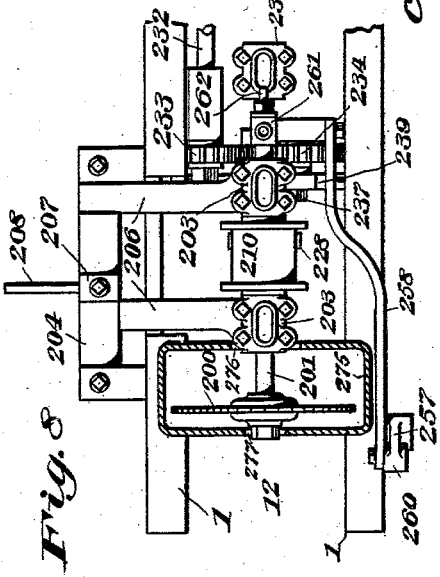
Witnesses
Inventors
Edwin Pollard
John R. Thomas,
By their Attys No. 708,073. Patented Sept. 2, 1902.
E. POLLARD & J. R. THOMAS.
FIRE LIGHTER MACHINE.
(Application filed July 27, 1901.)
(No Model.) 7 Sheets—Sheet 5.
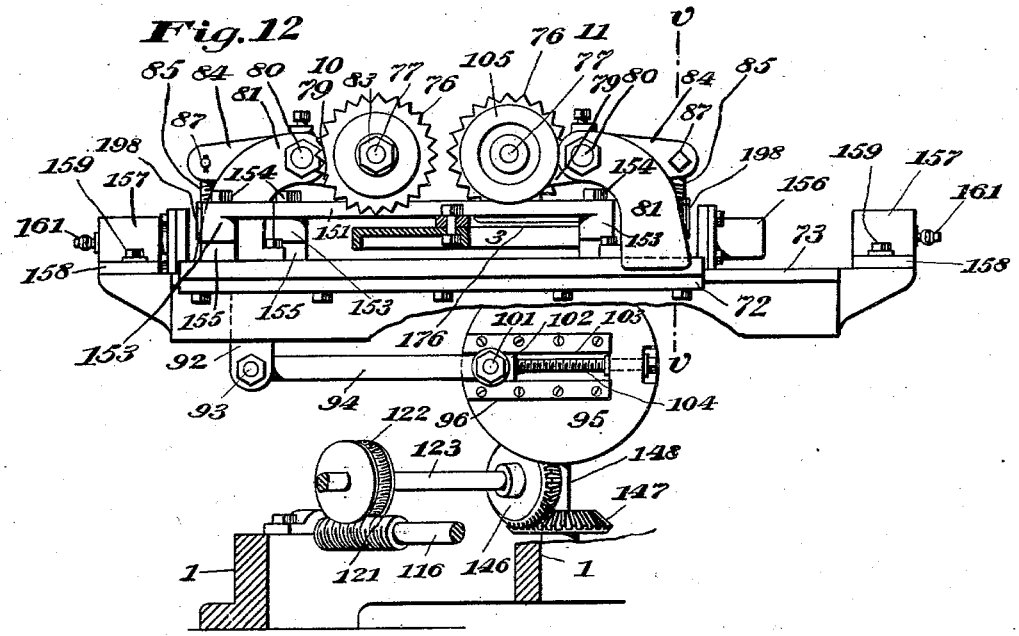
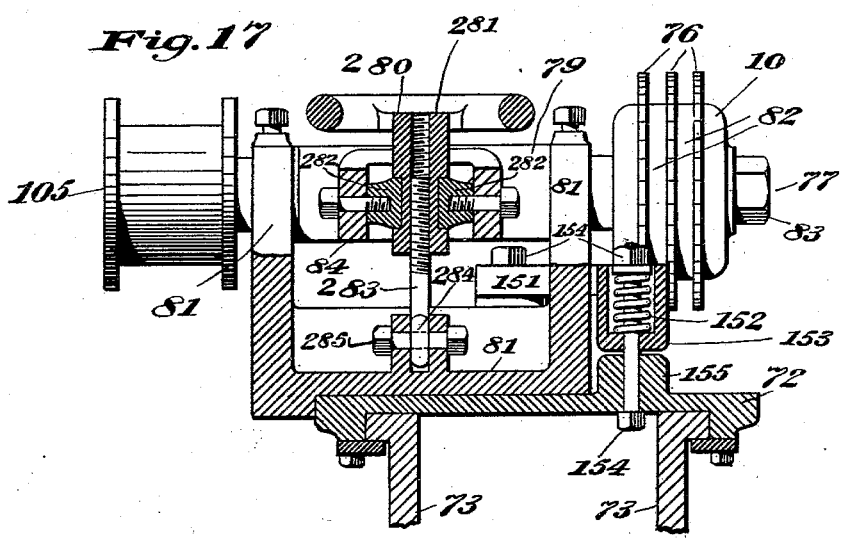
Witnesses
Inventors
Edwin Pollard
John R. Thomas,
By No. 708,073. Patented Sept. 2, 1902.
E. POLLARD & J. R. THOMAS.
FIRE LIGHTER MACHINE.
(Application filed July 27, 1901.)
(No Model.) 7 Sheets—Sheet 6.
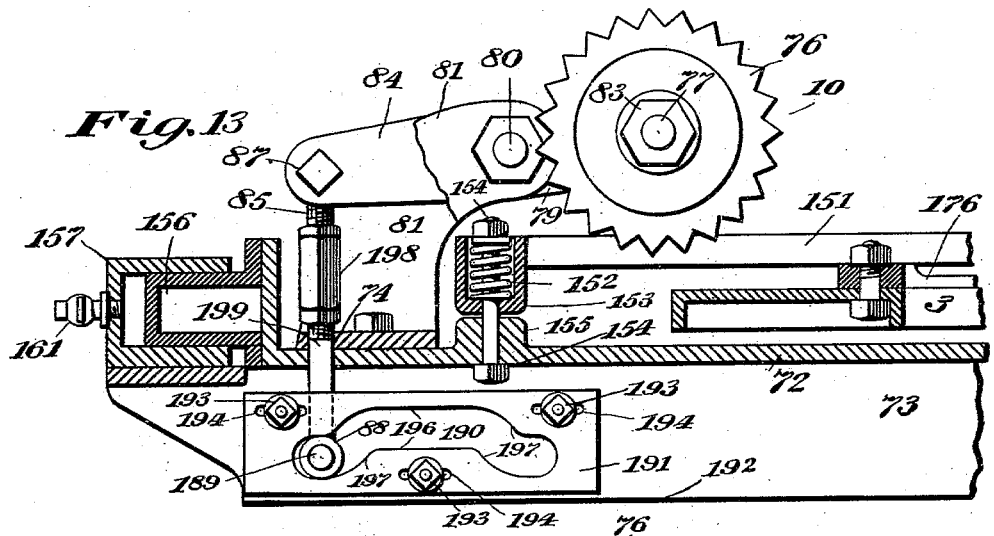
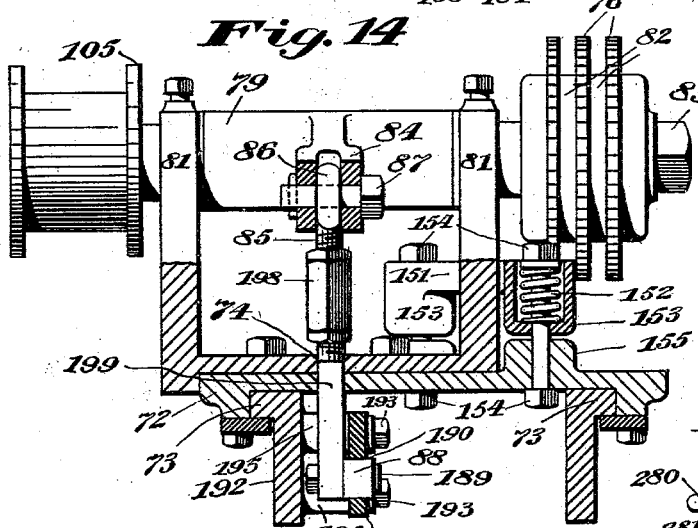
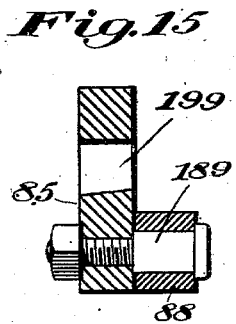
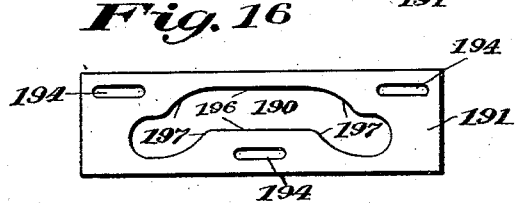
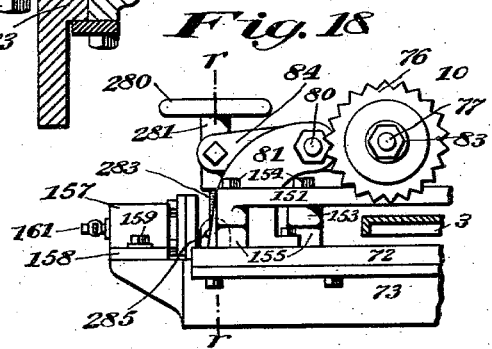

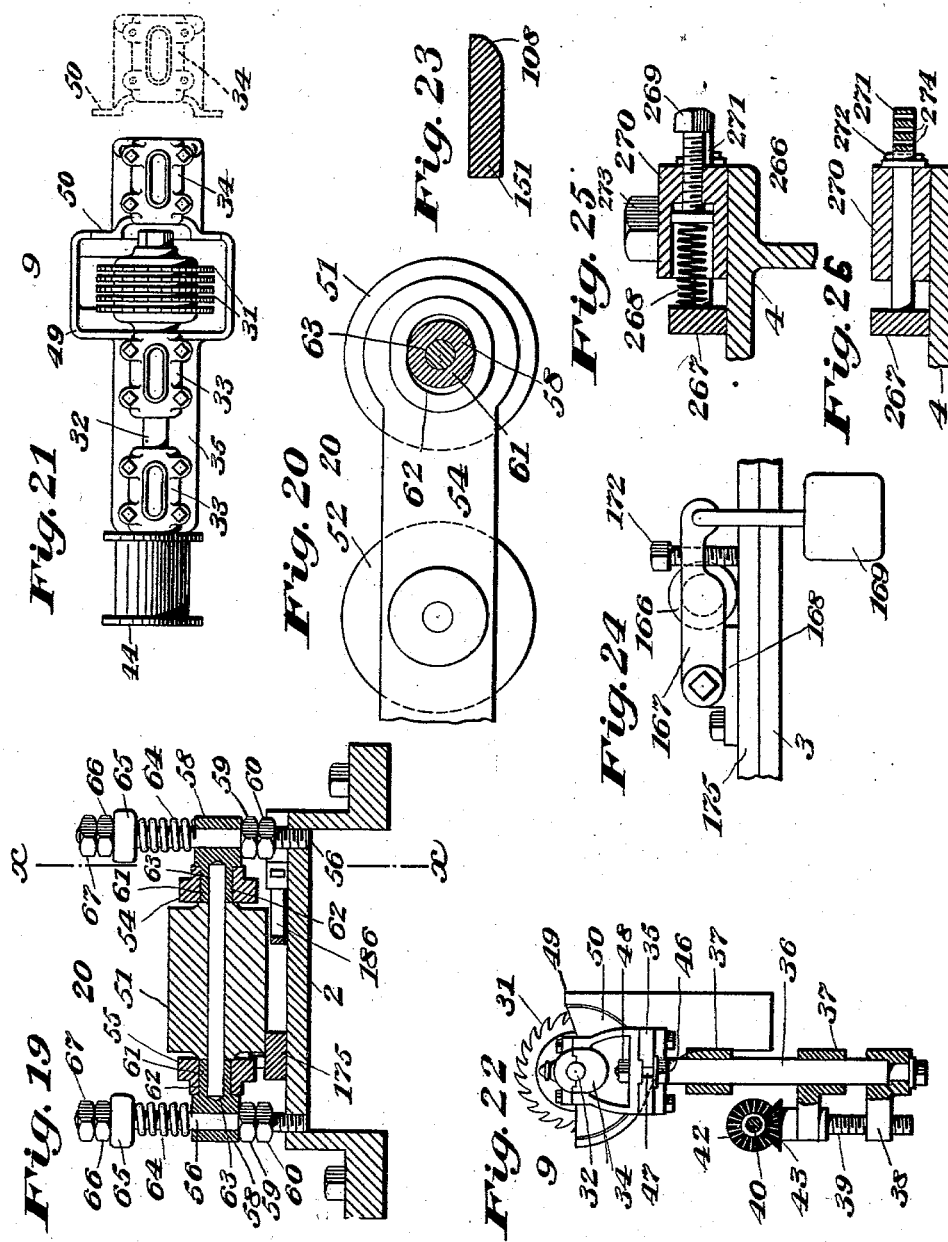

UNITED STATES PATENT OFFICE.

EDWIN POLLARD, OF SILSDEN, ENGLAND, AND JOHN R. THOMAS, OF CINCINNATI, OHIO, ASSIGNORS TO POLLARD & METCALFE, LIMITED, OF SILSDEN, ENGLAND.

FIRE-LIGHTER MACHINE.

SPECIFICATION forming part of Letters Patent No. 708,073, dated September 2, 1902.

Application filed July 27, 1901. Serial No. 69,965. (No model.)

*To all whom it may concern:*

Be it known that we, EDWIN POLLARD, a subject of the King of Great Britain and Ireland, residing at Silsden, in the county of York, England, and JOHN R. THOMAS, a citizen of the United States, residing at Cincinnati, in the county of Hamilton and State of Ohio, have jointly invented certain new and useful Improvements in Fire-Lighter Machines, of which the following is a specification.

Our invention relates to a machine for producing so-called "fire-lighters," an article used for convenience in starting fires in stoves, grates, hearths, and in other places and receptacles.

It is the object of our invention to provide a machine by means of which fire-lighters may be produced in large quantities economically, of regular form, and in convenient manner.

Our invention consists in providing a machine of this character in which the stock is fed by intermittently-operating feeding devices to position for operation upon it by transversely-moving grooving devices in such manner that the stock while being operated upon by the grooving devices may be at rest and be fed to position for operation of the grooving devices during intervals in which the grooving devices are not grooving the stock; further, in providing novel means for effecting the intermittent feed of the stock and novel devices for producing the cutting operations and timing the same, and, further, in the parts and in the construction, arrangement, and combinations of parts hereinafter more fully described and claimed.

In the drawings, Figure 1 is a plan view of a machine embodying our invention. Fig. 2 is a side elevation of the same. Fig. 3 is a side elevation illustrating the manner of driving the feeding-rolls. Fig. 4 is an enlarged view of the mutilated gear mechanism. Fig. 5 is a plan view of the machine with the top parts broken away for illustrating the driving connections. Fig. 6 is a rear end elevation illustrating the cutting-off device and means for operating the same. Fig. 7 is a longitudinal section of the rear of the machine, illustrating the cutting-off mechanism, taken on a line corresponding to the line $s\ s$ of Fig. 5. Fig. 8 is a plan view of the cutting-off mechanism with the tables removed for better illustration of parts and with the hood of cut-off saw in cross-section. Fig. 9 is a transverse section showing the means for reciprocating the cut-off-saw frame, taken on the line $t\ t$ of Fig. 2. Fig. 10 is a plan view of a piece of stock being worked. Fig. 11 is a bottom view of the same. Fig. 12 is a diagonal section on the line $u\ u$ of Fig. 1, illustrating the diagonal-grooving mechanism in side elevation. Fig. 13 is an enlarged detail, in side elevation, partly in section, on the line $q\ q$ of Fig. 1, showing the means for controlling the elevation of the diagonal-grooving cutters. Fig. 14 is a transverse section of the same on the line $v\ v$ of Fig. 12. Fig. 15 is a detail, partly in section, showing the roll connection with the link of the diagonal-cutting lever. Fig. 16 is a side elevation of the cam-plate for the same. Fig. 17 is a sectional detail on the line $r\ r$ of Fig. 18, illustrating a modification of the means for adjusting the diagonal-grooving cutters to height, showing also in cross-section the means for yieldingly holding the plate between the pair of diagonal cutters in place. Fig. 18 is a detail in side elevation, partly in section, of the same. Fig. 19 is a transverse section on the line $w\ w$ of Fig. 2, showing the yielding pressure mechanism above the lower grooving-cutters. Fig. 20 is a detail, partly in section, on the line $x\ x$ of Fig. 19, illustrating the roll-bearings for the pressure mechanism above the lower grooving device. Fig. 21 is a plan view of the lower grooving device and saddle for the same, also showing the removable side wall of its sawdust-hood, with its bearing, in dotted lines. Fig. 22 is a side elevation of the same with the connections for the saddle-posts shown in section. Fig. 23 is a transverse section of the holddown-plate between the diagonal-grooving cutters. Fig. 24 is a detail of pressure-roll construction. Fig. 25 is a transverse section on the line $y\ y$ of Fig. 2, showing the yielding side-pressure device for the stock at the feed-out table; and Fig.

26 is a similar view on the line z z of Fig. 2, showing the manner of limiting the inward movement of the pressure-plate.

1 represents the frame of the machine, which supports a feeding-in table 2, an intermediate table 3, and a feeding-out table 4. The stock is fed through the machine by lower feed-rolls 5 6 and upper feed-rolls 7 8, past longitudinal-grooving device 9, diagonally-reciprocating grooving devices 10 and 11, and is cut off to lengths by cutting-off device 12. The lower feed-rolls 5 6 have their shafts journaled in boxes 13, capable of being raised and lowered in suitable manner, as by means of adjusting-screws 14. The upper feed-rolls 7 8 have their shafts journaled in housings 15 16, swinging upon a rod 17, extending transversely of the frame. Adjusting-rods 18 connect at either side with the housings, respectively, and respectively carry adjusting-nuts 19, adapted to rest on the frame of the machine or lugs extending therefrom for limiting the downward movement of the upper rolls and adjusting that limit of movement. The lower ends of the adjusting-rods respectively connect with pressure-levers 21 22, pivoted to the frame, respectively, at 23 24 and connected to a weight-lever 25 by means of links 26, 27, 28, and 29. The grooving device is for providing one side of a strip of stock (represented by $a$) with a series of longitudinal grooves $b$. Grooving devices 10 11 are for providing the other side of the strip of stock with diagonal grooves $c$. Cutting-off device 12 is for cutting the strip of stock into lengths of the finished product, as shown by dotted line $d$, Figs. 10 and 11. The grooving device 9 is preferably stationarily located when the machine is in operation, while the grooving devices 10 11 and cutting-off device 12 are arranged to reciprocate during the operation of the machine, cutting the stock during intervals and being out of effective contact with the stock at other intervals, during which latter intervals the stock is fed up to new position for operation thereon by the cutting devices, the stock being permitted to be at rest while the diagonally-reciprocating cutting devices operate upon the same. The two sets of grooves $b$ and $c$ communicate with each other through ventilating-openings, as will be seen from an inspection of Figs. 10 and 11, and for securing this result the upper edges of the lower longitudinal-grooving saws 9 and the lower edges of the upper diagonal-grooving saws 10 11 must extend and cut into or across the said horizontal plane.

The grooving device 9 consists, preferably, of a series of grooving-saws 31, secured to and properly spaced upon a shaft 32, journaled in bearings 33 34 upon a saddle 35, which at each end has a post 36, slidable in bearing 37, secured to the frame and resting in a stirrup 38, connecting with an adjusting-screw 39 for raising and lowering the saddle. The adjusting-screws 39 at each end of the saddle are interconnected with an adjusting-shaft 40, having a hand-wheel 41, through the medium of gears 42 43. The shaft 32 carries a pulley 44, operated by a belt from pulley 45. The bearing 34 is releasably secured to the saddle, so that the same may be removed endwise from the shaft 32 to permit adjustment and removal of the saws 31. A T-bolt 46 takes through a slot 47 and has a nut 48 for firmly securing the bearing and saddle together. A hood 49 takes about the saws and is adapted to be attached to a blowpipe for removal of the sawdust. The main part of the hood is attached to or a part of the saddle, a removable side wall 50 of the hood being attached to the removable bearing for permitting access to the saw-blades.

A holddown device 20 above the saws is provided for holding the stock against the saws and comprises a series of rolls 51, 52, and 53. The roll 52 has its shaft journaled in side bars 54 55, bridging the opening for the saws between the tables 2 and 3. Posts 56 57 are secured with relation to the frame, respectively, to the front and to rear of the saw-blades. Supports 58 for the side bars and rolls are slidable longitudinally of the posts and positioned upon the same by means of set-nuts 59, secured by jam-nuts 60. Each support 58 has a shank 61, taking into an elongated opening 62, one at each end of each side bar. The inner end of each shank has a bore 63 for receiving one end of the shaft of either the roll 51 or 53. Each of the posts has a spring 64 taking about the same and against a support 58 for depressing the rolls and side bars. A washer 65 takes above the spring, and an adjusting-nut 66 screws about the post for adjusting the tension of the spring with a jam-nut 67 for holding the same in place. The elongated openings 62 are provided for permitting the relative differential elevation of the end rolls 51 and 53. This construction of holddown device insures firm pressure of the stock against the saws during the cutting operation, whether the stock is of uniform thickness or varying thickness, or one strip of stock is followed by another of equal or different thickness and at the same time offers little resistance to the forward feed of the stock. The stock next passes on to the intermediate table 3, to be operated upon by the reciprocating diagonal-cutting devices 10 11. These cutting devices are mounted upon a carriage 72, sliding upon a slideway 73, located diagonally of the frame. The cutting devices 10 11 are preferably duplicates of each other and may be mounted one at each end of the carriage and described as follows: Grooving-saws 76 are mounted upon a shaft 77, journaled in bearings 78 upon a lever 79, fulcrumed on a rod 80, mounted in bracket 81, rigidly secured to the carriage. The saws are spaced by collars 82, the whole being firmly secured to the shaft by nut 83. The lever 79 has a rearward extension 84. A link 85, having an eye 86, taking about a bolt 87, connects with the rearward extension 84. The other end of the link 85 supports a roll 88 on a stud 189. The roll takes into a groove 190 in a plate 191, secured to a cross-girth 192 of the frame by means of bolts 193, taking through slots 194 in the plate. Bosses 195, which may assume the form of washers, take between the plate 191 and the cross-girth and separate the plate from the cross-girth to accommodate the link 85. The groove 190 comprises a straight portion 196 and inclined or cam portions 197. Plates having straight portions of different lengths may be provided for different widths of stock. For instance, if stock six inches wide is being passed through the machine a plate having a straight portion 196 of approximately six inches long may be employed and so positioned that when the lowest part in the circle of the grooving-cutters has about reached the outer side edge of the stock the roll 88 will take against the inclined or cam-shaped part 197 of the groove, thereby depressing the link 85 and raising the cutters on the lever 79 out of the plane of the stock for permitting the stock to be advanced by the feed. This construction permits the transverse-grooving cutters to be positively raised out of the plane of the stock during the movement of the stock, and thereby reduces the transverse travel of the carriage 72 to the minimum, because if no provision were made for raising the cutters out of contact with the stock the transverse travel of the carriage 72 would have to continue until the entire transverse cutters were out of range of the stock. The groove 190 therefore forms a guide for controlling the elevation of the transverse-grooving cutters during the transverse travel of the carriage and forms means for reducing the length of transverse stroke of the carriage to the minimum, thereby saving time and increasing the capacity of the machine. In practice in cutting fire-lighters it is not essential that the transverse grooves shall be cut to the same depth throughout the entire width of the stock. The grooves may at their extreme ends, corresponding with the sides of the stock, be cut with an upward curve, so as to permit the raising of the transverse-grooving cutters to be initiated before the lowest point in the circle of the grooving-cutters when revolving has reached the extreme side edge of the stock, so that the raising of the cutters may begin before the cutters have completed their travel through the stock. The link 85 may be provided with a turnbuckle 198 for adjusting the normal height of the transverse-grooving cutters, and the lower end of the link 85 may be squared, as shown at 199, or, if desired, splined or made of such other cross-section to prevent its turning in its aperture 74 in the carriage 72. This latter sliding connection with the carriage is provided for causing the link to maintain its position with relation to the lever. The carriage has depending lugs 92 for receiving a pin 93, to which a pitman 94 is connected. A crank 95 includes a web 96, secured to the end of the shaft 97, journaled in bearings 98 diagonally of the frame. A wrist 101 extends from a slide 102, sliding in way 103 in the web, and is adjustable in the way by means of an adjusting-screw 104 for regulating the length of stroke of the pitman, and consequently the distance of travel of the carriage. The pitman 94 connects with the wrist-pin, and thereby imparts motion to the carriage. A pulley 105 is secured to each of the shafts 77 and receives motion from a belt driven from a suitable source of power, as from an overhead drum.

We will now describe the manner of driving the feed-rolls and imparting the reciprocating motion to the carriage, so that the cutting operation of the diagonal-grooving saws may be performed while the stock is at rest and the intermittent feed imparted to the stock while the diagonal-grooving saws are out of effective contact with the stock.

A counter-shaft 111 is driven from any suitable source of power, as by a belt taking about a pulley 112, secured to the counter-shaft, a loose pulley 113 being also provided for receiving the belt when it is desired to stop the machine. The counter-shaft carries a pulley 114 for receiving a belt taking about it and a pulley 115, secured to a worm-shaft 116, a loose pulley 117 being also on the same shaft for receiving the belt when the feed is thrown out of operation, as by means of a belt-shifter 118, operated by a hand-lever 119, connected to it through a link 120. The worm-shaft has thereon a worm 121, operating a worm-wheel 122, secured to a shaft 123, extending longitudinally of the machine and carrying a bevel-wheel 124, meshing with a bevel-wheel 125 on a shaft 126. The shaft 126 carries a mutilated gear 127, the teeth of which mesh with a pinion 128, mounted on a shaft 129, turning the pinion while the teeth of the gear 127 mesh therewith and permitting the pinion to remain at rest when the teeth on the gear 127 have passed beyond the pinion. The pinion 128 communicates motion to a system of gearing for driving the feed-rolls, to which latter intermittent motion is imparted through the intermittent motion of the pinion 128 and its shaft 129, imparted to the latter by the gear 127. The gear 127 has a shoulder 130 coincident with its first tooth, forming a wiper, arranged for striking a projection 131 in the nature of a toe on the pinion 128 for relieving the thrust between the initially-engaging teeth of the gear 127 and the pinion 128, and thereby preventing breakage. The shoulder and projection may, if desired, be secured to the shafts 126 and 129, respectively. The meeting faces of the wiper and toe are preferably curved for intimate and effective engagement between the same, with the toe extending beyond the pitch-line of the teeth of gear 127 and having an outer curved face 107, adjacent to a face 108, curved in the arc of a circle and coincident with the mutilated part of the gear 127 for preventing turning of the pinion 128 when its teeth are out of contact with the gear 127, a depression 109 in advance of the face 108 receiving the toe when turned by the wiper and a depression 110 receiving the toe at the end of its revolution. The pinion 128 meshes with a gear 133 on a shaft 134, a gear 135 being secured to the same shaft. The gear 135 meshes, respectively, with gears 136 and 137 on the shafts of the lower feed-rolls 5 and 6, respectively. The gear 136 meshes with a transmitting-gear 138, which in turn meshes with a transmitting-gear 139, which latter meshes with a gear 140 on the shaft of feed-roll 7. The gear 140 meshes with a transmitting-gear 141, which latter meshes with a gear 142 on the shaft of the roll 8. The shaft 123 also carries a bevel-gear 146, meshing with a bevel-gear 147 on an upright shaft 148, which latter carries a bevel-gear 149, meshing with a bevel-gear 150 on the crank-shaft 97, hereinbefore mentioned. When the crank turns, it imparts a reciprocating motion to the diagonally-slidable carriage, and when the crank-pin moves through the upper or the lower arc of its travel it imparts a comparatively rapid diagonal sliding movement to the carriage, the motion being retarded and gradually returning when the crank-pin moves through the extreme side arcs of its travel. The motion imparted to the moving agent of the diagonal-grooving device is continuous, the motion of the carriage, however, being retarded and gradually returned at the limits of its reciprocations, while the passage across the stock is comparatively rapid. During the intervals between the passages of the diagonal-cutting devices across the stock and while movement of the cutting devices is being retarded preparatory to their return the shoulder or wiper 130 will have taken against the projection or toe 131 and the teeth on gear 127 will have intermeshed with the teeth on the pinion 128, thereby imparting a forward motion to the stock in front of the diagonal-cutting devices, which latter will be ready for return by the time the stock has been fed forward a sufficient distance to present the proper new surface of the stock to the diagonal-cutting devices for operation. The stock takes under a plate 151, mounted on the carriage and yieldingly held against the stock by means of springs 152, let into pockets 153 in the plate and taking about adjusting-bolts 154 for regulating the tension of the springs, the plate resting on bosses 155 for limiting its downward movement. The plate 151 has an upturned feeding-in edge 108 and is held against the stock with just sufficient pressure to prevent displacement thereof while the diagonal cutters are acting upon the same. The carriage is provided at each end with a plunger 156, taking into a dash-pot 157, mounted on a plate 158, adjustably secured to the carriage by means of bolts 159, taking through slots 160 in the plate and into the slideways. A valve 161 is provided for regulating the resistance of pressure in the dash-pot. This construction forms a buffer for the diagonally-reciprocating carriage. The relation of the reciprocating motion of the diagonal cutters to the intermittent operation of the feed is such that when the cutters are diagonally passing through the stock the stock is at rest, and the stock is given a forward feed at the end of each crosswise movement of the cutters to or fro, which feed is arrested before the cutters again take into the stock for grooving the same on their return to either side of the stock. We have shown three grooving-saws mounted on each diagonal shaft, and six grooves are therefore cut at each passage of the diagonal cutters across the stock. The cutter-heads on the respective shafts are preferably placed a sufficient distance apart longitudinally of the stock to permit a number of grooves equal to the sum of the grooving-cutters on both cutter-heads to be cut within the space between the respective heads, and the length of forward feed imparted to the stock at each feeding motion is preferably approximately twice the distance occupied longitudinally of the stock by the grooves cut by the cutters on one cutter-head, so that the part of the stock cut by the diagonal cutters 10 will when the stock is advanced lie under the holddown-plate 151, adjacent to the cutters 11, leaving an uncut portion between said latter portion and the cutter 10, which in the next advance is brought to position in line with the cutters 11 and cut at the next sliding of the cutter-carriage. The operation is such that the finished stock will present a continuous series of diagonal grooves c upon the stock. Rolls 166 are adapted to take against the stock to hold the same against the tables. They are mounted in levers 167, pivoted in lugs 168 in the frame and given pressure against the stock by means of weight 169, or, if desired, by springs 170, adjustable by means of an adjusting-bolt 171. Set-bolts 172 limit the downward movement of the rolls 166. Side gages 175, 176, and 177 are provided, against which the stock takes in being fed through the machine. They are adjustable by means of bolts 178, taking into slots 179 in the tables. At its feeding-in end a side pressure-arm 180, having at its end a roll 181, is pivoted to the table at 182. It has a slot 183, through which a bolt 184 takes into the table for positioning the pressure-arm across the table toward and from the gage. The side pressure-arm preferably has a spring 185 for yieldingly pressing the roll against the stock. Other side pressure agencies, as springs 186, 187, and 188 may be provided at or near the cutting agencies for holding the stock up to the gage and be adjustable in suitable manner. The stock next passes to the cutting-off device 12, which consists, preferably, of a cutting-off saw 200, mounted on a mandrel 201, slidable longitudinally in and splined to a sleeve 202, journaled in bearings 203, supported on a reciprocating frame 204, hung upon a bar or rod 205. The reciprocating frame preferably has a lateral extension 206, in which the saw-arbor is journaled, and an upward extension 207, to which a counterbalance device is secured, consisting, preferably, of a bar 208, having a weight 209 attached thereto. The saw-arbor carries a pulley 210, and motion is imparted to it by a belt passing over a pulley 211 on the counter-shaft and over pulleys 212 and 213, changing the direction of travel of the belt. Each of the pulleys 212 and 213 is mounted in a yoke 214, having a shank 215, taking substantially horizontally into a socketed piece 216. The shank is adjustable in the socket both longitudinally of itself and for turning therein to give the pulley in the yoke the proper position and angle with relation to the driving-pulley and the pulley on the mandrel and is secured in place by means of a set-screw 217. The socketed piece 216 has a shank 218, taking into a second socketed piece 219, in which it is adjustable to height and arranged to turn for further adjustment of the pulley in the yoke, a set-screw 220 being provided for securing the same firmly in place. The second socketed piece rocks upon a rod 221, secured in brackets 222, attached to the frame. A set-screw 223 secures the second socketed piece with relation to the rod. These adjustments are provided for accurately setting the pulleys 212 and 213 to proper position and for angling the same to give the same the proper inclination for properly carrying and directing the belt for operating the saw-mandrel. This manner of driving the saw provides means whereby the saw-mandrel may be rocked during operation without materially affecting the tension of the belt and constant driving of the mandrel. Reciprocating motion is imparted to the cutting-off saw by means of a pitman 224, secured to the reciprocating frame by means of a bolt 225, and with a wrist 227 of a crank 228, having a shaft 229 mounted in bearings 230 in the frame. The pitman 224 is preferably divided, and provided with a turnbuckle 231 for regulating the elevation in which the cutting-off saw shall reciprocate. The crank-shaft 229 is operated from a shaft 232, driven as hereinafter explained. The shaft 232 carries a gear 233, meshing with a transmitting-gear 234, which meshes with a gear 236 on the crank-shaft 229. The gear 233 may have a differently-sized gear 233 substituted for it for imparting different speeds of reciprocation to the saw-mandrel for cutting off the stock in longer or shorter pieces with relation to the feed, as desired. For instance, a smaller gear may be substituted for the gear 233, and the stud 237 of the transmitting-gear 234 taken from its aperture 238 in the girth 239 of the frame and inserted into the aperture 240 for properly intermeshing the new gear 233 and the gear on the crank-shaft.

As hereinbefore explained, the diagonally-reciprocating grooving devices are arranged to cut a predetermined number of grooves of predetermined size, and the feeding device is arranged to feed forward the stock between crosswise movements of the diagonal grooving devices a predetermined distance at each forward feeding motion—namely, preferably twice the longitudinal distance occupied by the grooves made by the saws on one of the diagonal grooving-mandrels—which results in the stock being fed forward predetermined distances at predetermined times. It is desirable, however, to cut off the stock to varying lengths, for the reason that some stock that is fed through the machine is wider than others, and it is desirable to regulate the superficial area or cubic contents of cut-off pieces of stock representing the product, which result is attained by varying the number of reciprocations of the cutting-off saw within each forward motion of the stock. For this purpose we provide the change-gears mentioned and also prefer to effect the reciprocations of the cutting-off device by connecting its source of power with the intermittently-operating mechanism for driving the feeding device. We therefore mount a bevel-gear 241 on the shaft 232, meshing with a bevel-wheel 242 on the shaft 129, which manner of connection effects a reciprocation of the cutting-off devices while the stock is being fed, but permits the cutting-off device to be at rest while the stock is at rest. The cutting-off saw cuts off the stock while the stock is moving forward in its feed. It is desirable, therefore, to also provide a longitudinal movement to the saw-arbor coincident with the forward motion of the feed, and for effecting this and for also giving the feeding-out table 4 a similar movement we provide the following devices: A rock-shaft 245 is mounted in the frame and a bell-crank lever 246 is secured to the rock-shaft. One of the arms of the bell-crank lever is connected with the reciprocating frame of the cutting-off saw by a link 247, (adjustable in length, if desired,) preferably by swiveling connections 248 249. Table 4 slides longitudinally on ways 250. The upwardly-extending arm of the bell-crank lever is connected to the feeding-out table 4 by means of a link 251, pivoted to the bell-crank lever in one of apertures 252 253 and to a depending projection 254, extending from the feeding-out table 4 in one of apertures 255 256 in the depending projection. An arm 257 is also secured to the rock-shaft for imparting a longitudinal motion to the saw-arbor by means of a link 258, connected with the arm through one of apertures 259 260. The other end of the link is pivotally connected to a collar 261, taking about the end of the saw-mandrel for permitting the saw-mandrel to turn therein. A guide-pin 262, extending from the reciprocating frame of the saw-mandrel, takes through an aperture in the collar for guiding the same and preventing turning thereof. While being cut off the stock may be held to the table by means of springs 263, extending from a rod 264, secured in lugs on the frame. The outer ends of the springs may have a pressure-block 265 for taking directly against the stock. The side gage 177 is mounted on and reciprocates with the feeding-out table. A pressure device 266 is also secured to the feeding-out table, and consists, preferably, of a side pressure-plate 267, yieldingly held against the stock by means of springs 268, the tension of which is regulated by set-bolts 269, screwing into a rigid part 270 of the pressure device, with guide-pins 271, secured to the pressure-plate 267 and sliding in apertures in the rigid part, with pins 272, taking through apertures 274 to limit their inward movement. Bolts 273 secure the rigid part 270 to the table 4. The side pressure-plate holds the stock as it is being cut by the cutting-off saw and prevents the cut-off portion from being thrown from the machine. The cut-off saw preferably has a hood 275 for removal of the sawdust, with slots 276 277 permitting reciprocation of the saw. If it is desired to cut off longer pieces of stock, the smaller gear 233 is employed for imparting the up-and-down reciprocation to the cutting-off saw, and the links 251 and 258 are respectively connected with the upper apertures in the bell-crank lever 246 and arm 257 for imparting a longer longitudinal stroke to the cut-off saw. The vertical stroke and longitudinal movement of the cutting-off saw are simultaneous for permitting the cutting-off saw to pass through and travel with the stock at the same time. If it is desired to cut off shorter pieces of stock, a larger gear 233 is substituted for the smaller gear 233, and the stud of the transmitting-gear is inserted in the aperture 240 and the links 251 and 258 connected, respectively, with the lower apertures in the bell-crank lever 246 and arm 257, respectively, for imparting a more rapid vertical reciprocation and shorter longitudinal movement to the cutting-off saw, the longitudinal movements and vertical reciprocations being more rapid with relation to the feed of the stock.

In Figs. 17 and 18 we have shown a modification of means for adjusting the transverse cutters to height. In this modification the rearward extension 84 of the lever 79 has journaled in it a hand-wheel 280, having an internally-screw-threaded shank 281 by means of having a split trunnioned bearing 282, taking into an annular groove in the shank 281. An adjusting-screw 283, having an eye 284, taking about a bolt 285 in lugs in the carriage, takes into the internally-threaded aperture of the hand-wheel shank for the purpose of permitting the raising and lowering of the rearward extension of the lever and thereby adjusting the normal position of the cutters for depth of cut.

We desire to be understood that instead of diagonal grooves grooves may be made extending directly across at right angles to the longitudinal grooves, and the word "transversely" is intended to be broad enough to cover the movable grooving device, whether it operates diagonally or at right angles.

We claim—

1. In combination, cutters for making longitudinal grooves on one side of the material, cutters for making grooves transversely on the other side of the material, said cutters being arranged to cut into the same intermediate plane and through the material at the intersection of the grooves and intermittent feeding mechanism, substantially as described.

2. In combination, cutters for making longitudinal grooves on one side of the material, cutters for making grooves transversely on the other side of the material, means for moving said transverse grooving-cutters to and from the path of the material so that said lengthwise and transverse cutters cut into the same intermediate plane and through the material at the intersection of the grooves and intermittent feeding means, substantially as described.

3. In a fire-lighter machine, the combination of a transversely-reciprocating carriage, a grooving device mounted thereon and reciprocating therewith, a table for the stock between the grooving device and the carriage, and a holddown-plate taking above the stock secured to and reciprocating with the carriage, substantially as described.

4. In a fire-lighter machine, the combination of a transversely-reciprocating carriage, a grooving device mounted thereon and reciprocating therewith, a table for the stock between the grooving device and the carriage, and a holddown-plate taking above the stock secured to and reciprocating with the carriage, with springs for yieldingly holding the plate against the stock, substantially as described.

5. In a fire-lighter machine, the combination of a frame, a carriage reciprocating diagonally with relation thereto, grooving-cutters mounted thereon and moving diagonally therewith, a table stationarily positioned between the cutters and the carriage, and a diagonally-reciprocating pressure-plate for the stock reciprocating with the carriage.

6. In a fire-lighter machine, the combination of a frame, a carriage reciprocating transversely thereof, a pair of grooving devices mounted thereon, a holddown-plate between the grooving devices, with an intermittent feed, constructed and arranged for having the pressure-plate take over a cut and an uncut portion of a strip of stock at each forward movement of the feed.

7. In a fire-lighter machine, the combination of a frame, a transversely-reciprocating carriage, a pair of grooving devices mounted thereon and reciprocating therewith, a stationary table for the stock between the grooving devices and the carriage, with a holddown-plate for the stock above the table and between the pair of transversely-reciprocating grooving devices.

8. In a fire-lighter machine, the combination of a frame, a transversely-reciprocating carriage, grooving-cutters mounted thereon, a feeding device, a cutting-off saw, an arbor therefor, a reciprocating frame in which the arbor is mounted, a reciprocating feeding-out table, a rock-shaft, with connections for the saw-arbor and the feeding-out table to the reciprocating frame of the saw-arbor through the rock-shaft for longitudinally reciprocating the saw-arbor and feeding-out table.

9. In a fire-lighter machine the combination of a frame, a transversely-reciprocating carriage, grooving-cutters mounted thereon, a feeding device, a cutting-off saw, an arbor therefor, a reciprocating frame in which the arbor is longitudinally slidable, a feeding-out table, a rock-shaft, rocking arms and links connecting the saw-arbor and feeding-out table with the rock-shaft, and a connection between the reciprocating frame of the saw-arbor and the rock-shaft for rocking the latter.

10. In a fire-lighter machine, the combination of a frame, a transversely-reciprocating carriage, grooving-cutters mounted thereon, a feeding device, a cutting-off saw, an arbor therefor, a reciprocating frame in which the arbor is longitudinally slidable, a feeding-out table, a rock-shaft, rocking arms and links connecting with the saw-arbor and feeding-out table, a plurality of connections between the rocking arms and links for varying the longitudinal movement of the saw-arbor and feeding-out table, and a connection between the reciprocating frame of the saw-arbor and the rock-shaft for rocking the latter.

11. In a fire-lighter machine, the combination of a frame, a transversely-reciprocating carriage mounted thereon, with grooving means for the carriage, feeding mechanism, an intermittently-operating shaft for the feeding mechanism, a cutting-off saw, a shaft extending longitudinally of the machine, with gearing between the latter shaft and the intermittently-operating shaft of the feeding mechanism, a reciprocating frame for the cutting-off saw, with a crank and pitman between the latter and the longitudinal shaft for reciprocating the cutting-off saw.

12. In a fire-lighter machine, the combination of a feeding-out table, a saw-arbor, a reciprocating frame therefor, a crank for moving the frame, a rock-shaft, and connections between the saw-arbor and feeding-out table and the rock-shaft for longitudinally reciprocating the saw-arbor and feeding-out table simultaneously with the reciprocating movement of the saw-arbor frame imparted by the crank.

13. In a fire-lighter machine, the combination of a frame, a carriage reciprocating transversely thereof, grooving-cutters mounted thereon and moving therewith, a cutting-off saw, a reciprocating slidable arbor for the same, a frame for the latter, a slidable feeding-out table, a rock-shaft, with a plurality of connections respectively between the arbor and feeding-out table and the rock-shaft, with a reciprocating connection from the saw-arbor frame to the latter for simultaneously longitudinally sliding the saw-arbor and feeding-out table with the reciprocating movement of the arbor.

14. In a fire-lighter machine, the combination of a frame, a transversely-reciprocating carriage, a grooving device mounted thereon and moving therewith, a cutting-off saw, a reciprocating frame for the same, an arbor for the saw slidable longitudinally in the frame, a feeding-out table, a rock-shaft, arms and links connecting the saw-arbor and feeding-out table with the rock-shaft, a plurality of connections between the arms and the links, a connection between the reciprocating frame of the saw-arbor and the rock-shaft for rocking the latter, with a crank for reciprocating the arbor-frame, a driving-shaft for the crank, with change-gears between the driving-shaft and crank-shaft, constructed and arranged for regulating the speed of reciprocations of the saw-arbor frame and longitudinal movement of the saw-arbor and feeding-out table.

In testimony whereof we have signed our names hereto in the presence of two subscribing witnesses.

EDWIN POLLARD.
JOHN R. THOMAS.

Witnesses:
THOS. P. EGAN,
PHILIP W. TOZZER.